United States Patent Office 3,415,864
Patented Dec. 10, 1968

3,415,864
BIS-(TRIMETHYLSILYL)TRIFLUOROACETAMIDE
Charles W. Gehrke and David L. Stalling, Columbia, Mo.,
assignors to Research Corporation, New York, N.Y.
No Drawing. Filed Sept. 11, 1967, Ser. No. 666,975
1 Claim. (Cl. 260—448.2)

ABSTRACT OF THE DISCLOSURE

Bis-(trimethylsilyl)trifluoroacetamide, a reagent for making trimethylsilyl derivatives of amino acid for analysis by gas-liquid chromatography.

---

This invention relates to an improved silylating agent. In one specific aspect, it relates a novel bis-(trimethylsilyl) substituted amide.

One approach to the analysis of amino acid mixtures and other biologically important mixtures of molecules containing amino, hydroxy, carboxy, imino, amide, and mercapto groups (proton donors) is prepare trimethylsilyl derivatives of the constituents present for analysis by gas-liquid chromatography. Bis-(trimethylsilyl) acetamide has been reported as a very effective silylating agent by Klebe et al., J.A.C.S., 88, 3390 (1966). However, its principal by-product, mono-(trimethylsilyl) acetamide, has a chromatographic retention time similar to that of the trimethylsilyl derivatives of the volatile amino acids, e.g., alanine and valine, and interferes with their analysis.

We have discovered bis-(trimethylsilyl)trifluoroacetamide, an extremely potent silylating reagent for converting amino acids to their trimethylsilyl derivatives. Bis-(trimethylsilyl)trifluoroacetamide and its principal reaction by-product, mono-(trimethylsilyl)trifluoroacetamide, are more volatile than the most volatile amino acid derivatives and do not interfere with their analysis. Moreover, bis-(trimethylsilyl)trifluoroacetamide reacts with the amino acids asparagine and glutamine making possible their analysis by gas-liquid chromatography. No silylating reagent has been reported heretofore which gives a satisfactory conversion of these amino acids to volatile trimethylsilyl derivatives.

It is, therefore, a principal object of the present invention to provide a novel silylating reagent particularly useful in the analysis of amino acid mixtures by gas-liquid chromatography.

This and other objects and advantages of the present invention will become apparent on consideration of the discussion and illustrative examples which follow.

Bis-(trimethylsilyl)trifluoroacetamide is made by the action of trimethylsilyl chloride on trifluoroacetamide, preferably in the presence of an amine to react with the hydrogen chloride formed. The overall preparative reaction may be illustrated as follows:

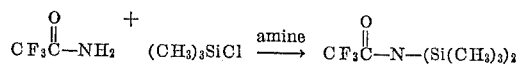

After filtration from the resultant solid amine hydrochloride, the product is isolated by distillation under vacuum.

The amino acid or other mixture to be analyzed is heated with bis-(trimethylsilyl)trifluoroacetamide in a sealed tube, preferably in the presence of acetonitrile as the solvent. The trimethylsilylated derivatives are then subjected to conventional gas-liquid chromatographic analysis.

Example 1

Preparation of bis-(trimethylsilyl)trifluoroacetamide. Trifluoroacetamide (58 grams) was placed in a one liter, 3-necked flask fitted with overhead stirrer, addition funnel, and reflux condenser equipped with a drying tube to keep out atmospheric moisture. Triethylamine (270 ml.) was added to trimethylchlorosilane (146 grams) and the mixed reagent added slowly to the flask over a period of 30 minutes to prevent excessive evolution of triethylamine hydrochloride and plugging of the condenser. The contents of the flask were then refluxed gently for about 10 hours.

The reaction mixture, containing a large amount of solid triethylamine hydrochloride, was filtered under a nitrogen atmosphere and the precipitate washed thoroughly with triethylamine. The filtrate was vacuum distilled using a fractionating column. Triethylamine was recovered and bis-(trimethylsilyl)trifluoroacetamide obtained as a clear liquid boiling at 47° C. at a pressure of 27 mm. The product was stored in a brown bottle in a dry box under nitrogen.

Elemental analysis.—$C_8F_3H_{18}NOSi_2$ theory, percent: H, 7.01; N, 5.44; C, 37.33; F, 22.14. Found, percent: H, 6.97; N, 5.67; C, 37.44; F, 22.34.

Example 2

Preparation of amino acid trimethylsilyl derivatives. An amino acid mixture was heated at 150° C. for 15–30 minutes in a closed tube containing 0.4 ml. of a 1:1 (v./v.) solution of acetonitrile: bis-(trimethylsilyl)trifluoroacetamide for each milligram of amino acid. Satisfactory results were obtained for 18 of the natural protein amino acids present in the mixture. Analysis by gas-liquid chromatography was conventional.

We claim:
1. Bis-(trimethylsilyl)trifluoroacetamide.

References Cited

UNITED STATES PATENTS 3,188,336   6/1965   Haszeldine _____ 260—448.2

OTHER REFERENCES

Klebe et al.: J.A.C.S. 88, 3390 (1966).

TOBIAS E. LEVOW, Primary Examiner.
J. P. PODGORSKI, Assistant Examiner.

U.S. Cl. X.R.
260—529, 534; 73—23.1